July 12, 1949.   H. F. McCLESKEY   2,475,908
DRAG RAKE
Filed Nov. 19, 1945   3 Sheets-Sheet 2
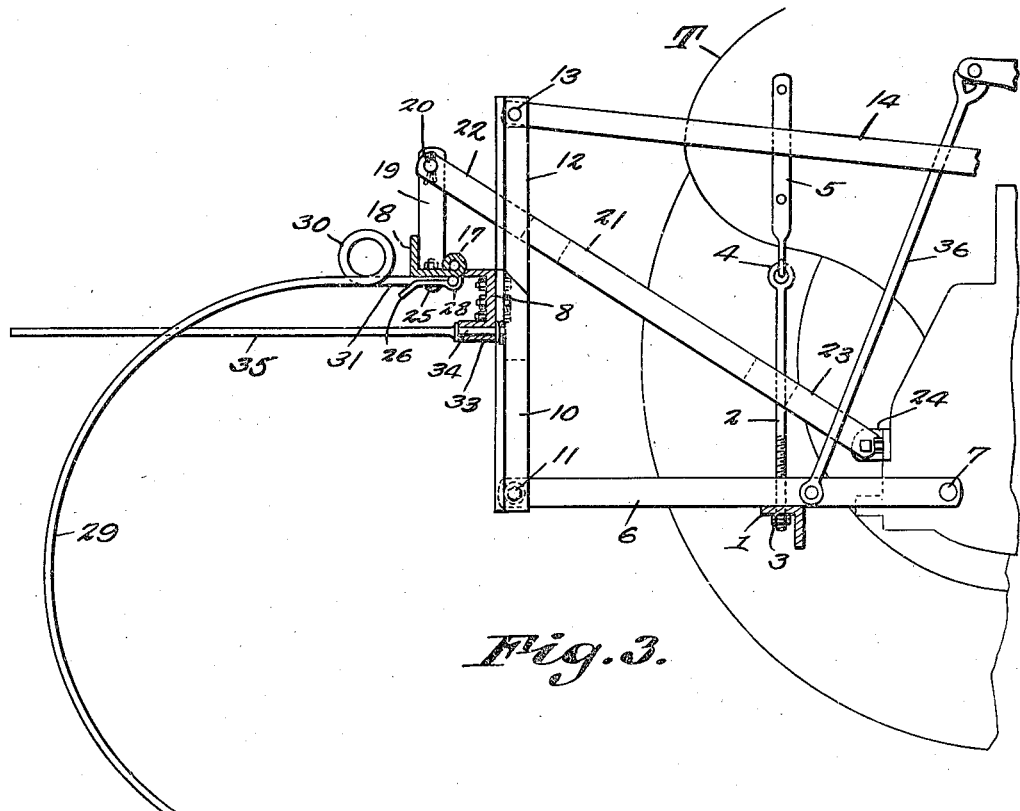
Fig. 3.
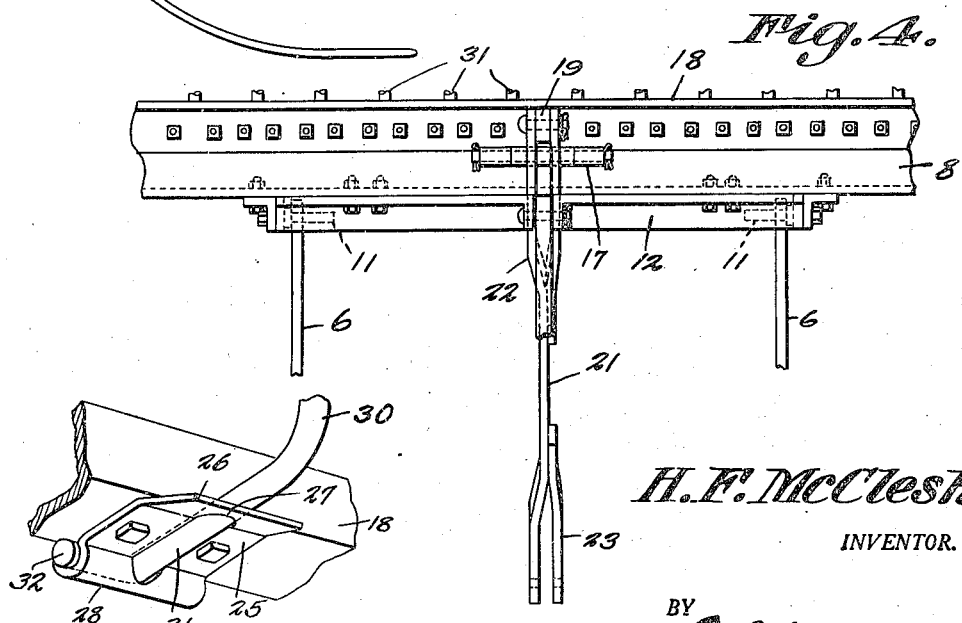
Fig. 4.
Fig. 6.
H. F. McCleskey
INVENTOR.
BY
ATTORNEYS.

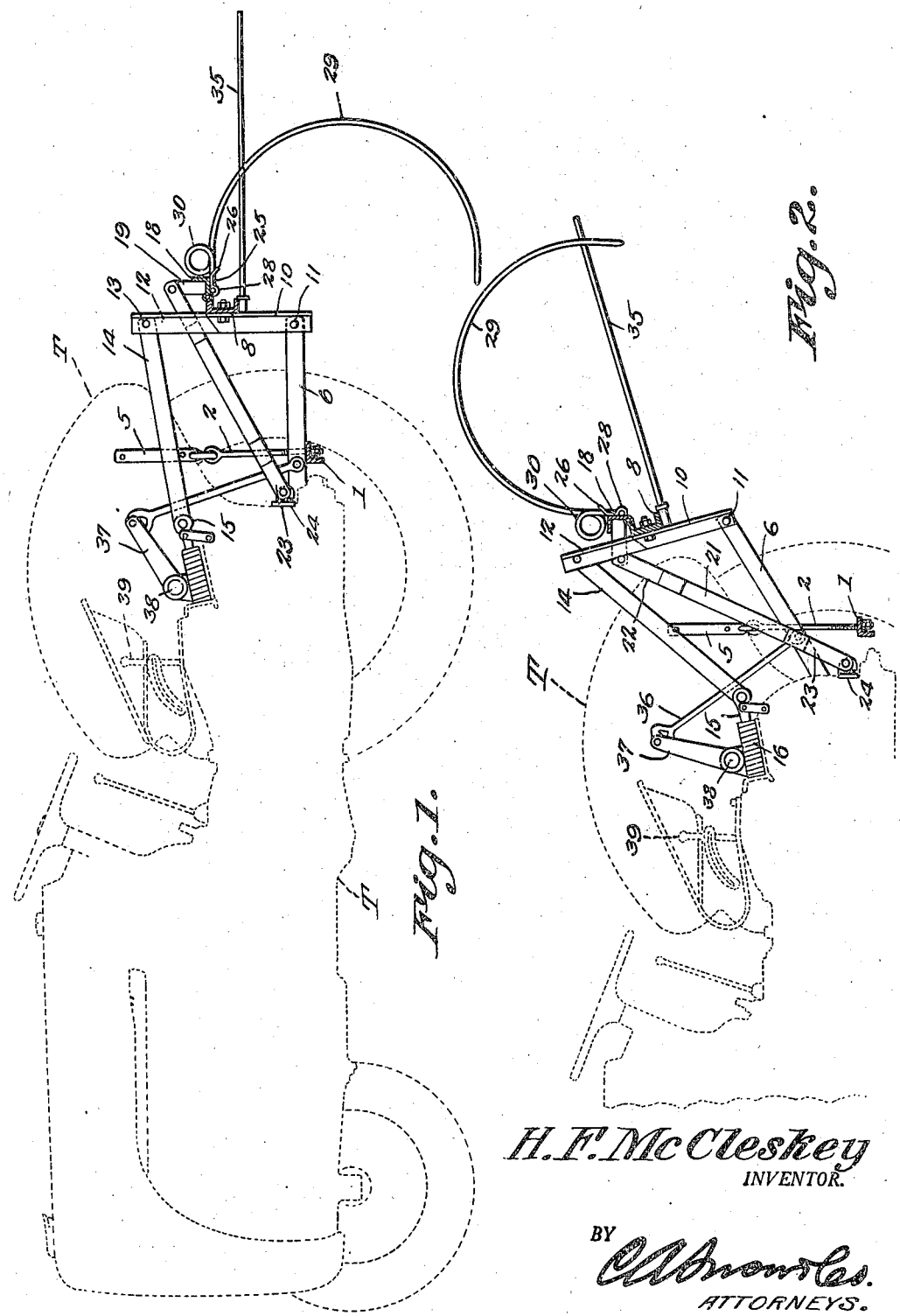

July 12, 1949.  H. F. McCLESKEY  2,475,908
DRAG RAKE

Filed Nov. 19, 1945  3 Sheets-Sheet 3

INVENTOR.
H. F. McCleskey
BY
ATTORNEYS.

Patented July 12, 1949

2,475,908

UNITED STATES PATENT OFFICE 2,475,908

DRAG RAKE

Henry F. McCleskey, Marietta, Ga.

Application November 19, 1945, Serial No. 629,528

2 Claims. (Cl. 56—27)

1

This invention relates to drag rakes, one of the objects being to provide an efficient rake designed to be connected to the back end of a tractor or another suitable vehicle and which is equipped with means by which the rake can readily be lifted from active position for the purpose of delivering material accumulated thereby.

Another object of the invention is to provide means by which material is stripped from the rake when said rake is lifted to load-releasing position.

Another object is to provide a rake which is durable, will not readily get out of order, and can be connected readily to a tractor or the like.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings, the preferred form of the invention has been shown.

In said drawings,

Figure 1 is a central vertical section through the rake, the same being shown connected to the back end of a tractor, indicated by broken lines, the rake being in active position.

Figure 2 is a view similar to Figure 1 showing the rake in delivering position.

Figure 3 is an enlarged section through the attachment viewed from the side opposite to that illustrated in Figure 1 and showing the connection between the frame and one of the stripping rods.

Figure 4 is a top plan view of a portion of the attachment.

Figure 6 is a perspective view showing the means employed for attaching a rake tine to its attaching beam or base.

Figure 5:
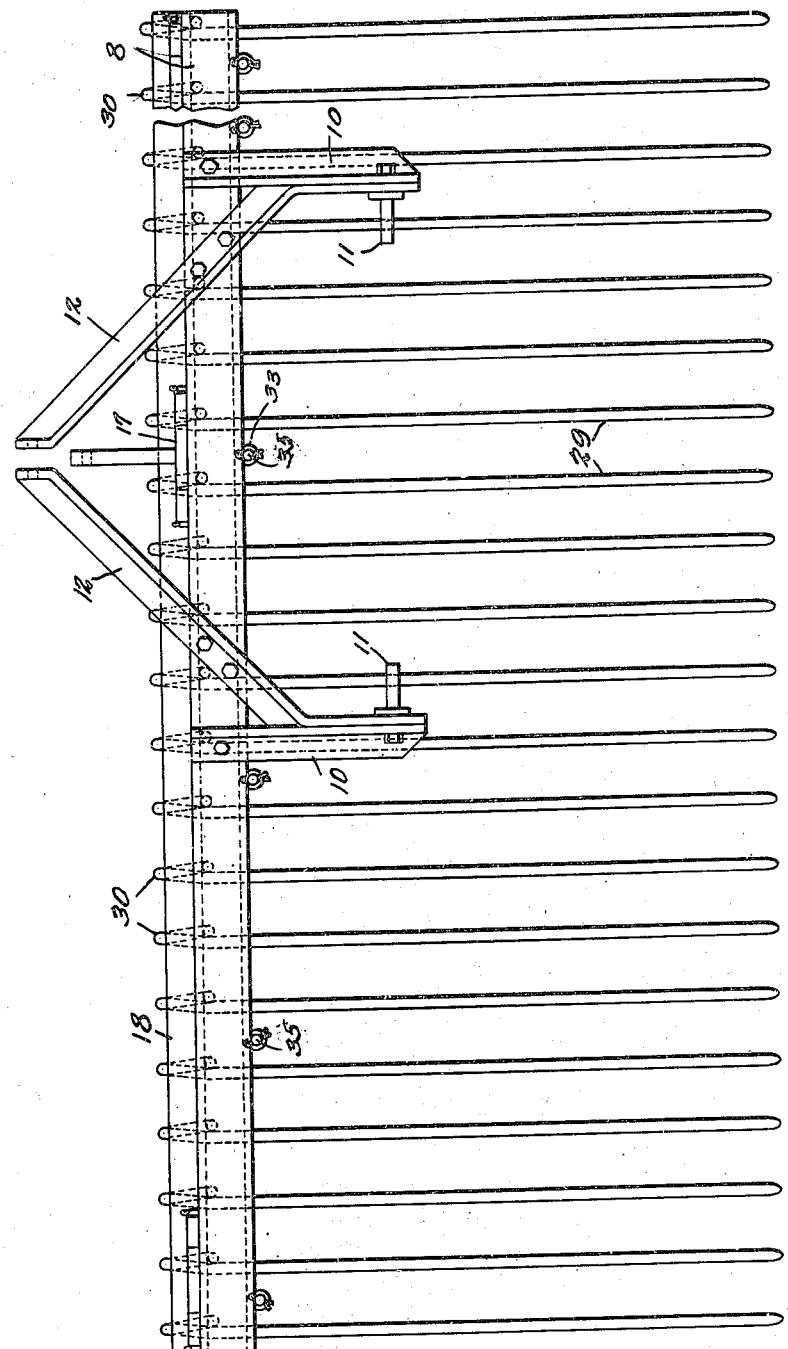
Figure 5 is a view of the rake and its connecting beam detached from the operating means, said rake being viewed from the front.

Referring to the figures by characters of reference, 1 designates a transverse supporting bar suspended at its ends by threaded rods 2 and nuts 3 which can be adjusted upwardly and downwardly to raise or lower the bar. These bolts 2 are loosely connected at 4 to attaching strips 5 connected to opposed portions of the tractor T or the like adjacent to the rear end thereof.

Bar 1 serves normally to support side links 6 which are pivotally connected at their rear ends

2 to the respective sides of the tractor as indicated at 7.

An attaching beam 8, preferably channeled, is provided between its ends and preferably at equal distances from the center thereof with arms 10 rigidly joined thereto and extending downwardly therefrom, these arms being pivotally connected at their lower ends to the side links 6 by means of studs 11 which are extended toward each other and are aligned, as shown in Figure 5. Upwardly converging connecting strips 12 are rigidly joined to the depending arms 10 and cooperate to form a bail the upper end of which is pivotally joined as at 13 to an upper link 14 which extends backwardly to a rod 15 carrying a cushioning spring 16 which can be of any suitable construction and arrangement.

The channeled beam 8 is provided with suitably located hinges 17 for connecting angle beam 18 to the beam 8. This angle beam constitutes the head of the rake and is provided with a standard 19 rigidly secured thereto and pivotally connecting at 20 to a connecting arm 21 which is forked at 22 to straddle standard 19 and is also forked at its other end as shown at 23 to straddle and pivotally engage a bracket 24 attached to the rear end of the tractor T.

Secured to the bottom of the head 18 is a series of attaching plates 25 each of which has an angularly disposed flange 26 along one edge provided with a slot 27, while the opposite edge of the plate is bent to form a clamping member 28. Each tine of the rake consists of an arcuate portion 29 merging into a coil 30 from which is extended a straight portion 31 and a terminal finger 32 extended at right angles thereto. The parts are so proportioned that when the plate 25 is attached to the bottom of beam or head 18 it will receive the straight portion 31 of the tine within slot 27 while finger 32 will be received within the clamping member 28. This is clearly shown in Figure 6 and obviously, when the plate is tightly fastened to the head 18 the tine will be held securely to the head and will be prevented from rotating relative to the head.

Any desired number of tines can be used and they can be spaced apart any desired distances.

Beam 8 is provided at desired points with sleeves 33 integral therewith. In each of these sleeves is secured a stem 34 located at one end of a stripping rod 35. The parts are so located and proportioned that when the tines are in their lower or active positions, as shown in Figures 1 and 3, the stripping rods 35 which are straight from end to end, will extend between the tines and rearwardly therebeyond at points adjacent to the upper ends of the tines. In other words, the stripping rods are maintained constantly at fixed angles relative to the beam 8.

Lifting rods 36 connect the side links 6 to crank arms 37 extending from a shaft 38 mounted on the rear portion of the tractor and any suitable means, forming no part of the present invention, can be used for rotating this shaft. For example, the shaft can be rotated hydraulically by the action of a lever indicated at 39.

Under normal operating conditions, the tines of the rake are in their lowermost positions with their lower ends extending forwardly toward the vehicle or tractor T and in contact with the ground. Consequently, as the rake is drawn forwardly, these tines will gather up the hay or other material in the path thereof. When the rake is filled with this gathered material, its contents can be dumped simply by operating the crank arms 37 so as to pull upwardly through lifting rods 36 upon the side links 6. This will cause the side links to swing upwardly about the pivotal connections 7, thereby raising the arms 10 and 12 the upper portions of which will be swung forwardly because of the restraint exercised by the upper link 14. Thus, as shown in Figure 2, at the same time beam 8, which is moved upwardly with the arms 10 and 12, will elevate the head 18. As this head is held under restraint by the connecting arm 21 and the standard 19, swinging about the connection with bracket 24, it will be apparent that the upward movement of the parts will result in the tines being swung upwardly relative to the beam 8 and to the stripping rods 35. Thus the load carried by the tines will be stripped therefrom by the fingers 35 and dropped to the ground thereunder. As soon as the arms 37 are returned to their normal position, as shown in Figure 1, the rake tines and other parts associated therewith will also drop to their normal positions.

What is claimed is:

1. A drag rake attachment for tractors or the like including a cross beam, a rake head extended longitudinally thereof and hingedly joined thereto for movement through substantially a quarter circle, tines fixed to and extending from the head, upper and lower arms fixedly joined to the beam, side links positioned to connect the lower arms to the side portions of the tractor, an upper link pivotally connected to the upper arms, cushioning means for the upper link, a connecting arm angularly disposed relative to the links, means for pivotally joining said arm to the rear end of a tractor or the like, a standard on the head pivotally connected to the connecting arm, and means connected to the side links for raising and lowering said links and the arm, said arm and links being positioned to swing the head and tines relative to the beam during the swinging movement of the links.

2. The combination with a vehicle, of a drag rake connected to the back end thereof and including upper and lower forwardly converging links pivotally connected to the vehicle, a cross beam, upper and lower arms fixedly joined to the cross beam and pivotally connected to the upper and lower links respectively, a rake head extending longitudinally of and hingedly connected to the beam for movement through substantially a quarter circle, tines fixedly joined to and extending from the head for movement therewith, a standard on the head and fixed thereto, a connecting arm pivotally joined to the standard and to the back end of the tractor, said arm being disposed at an angle relative to the links, said links and arms having their pivotal connections with the tractor out of alignment, and means for simultaneously swinging the links and arms upwardly or downwardly, said arm and standard constituting means for swinging the tines relative to the beam during the swinging movement of the links.

HENRY F. McCLESKEY.

REFERENCES CITED

The following references are of record in the file of this patent:

UNITED STATES PATENTS

| Number | Name | Date |
| --- | --- | --- |
| 2,226,460 | Bristol et al. | Dec. 24, 1940 |
| 2,328,121 | Bartek | Aug. 31, 1943 |
| 2,352,466 | Arps | June 27, 1944 |
| 2,364,303 | Martin | Dec. 5, 1944 |